US012766506B2

(12) United States Patent
Torniainen et al.

(10) Patent No.: US 12,766,506 B2
(45) Date of Patent: Oct. 20, 2026

(54) MULTIZONAL MICROFLUIDIC DEVICES

(71) Applicant: Hewlett-Packard Development Company, L.P., Spring, TX (US)

(72) Inventors: Erik D. Torniainen, Corvallis, OR (US); Hilary Ely, Corvallis, OR (US); Michael W. Cumbie, Corvallis, OR (US); Rachel M. White, Corvallis, OR (US); Adam Higgins, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 809 days.

(21) Appl. No.: 16/643,867

(22) PCT Filed: Nov. 22, 2017

(86) PCT No.: PCT/US2017/062943

§ 371 (c)(1),
(2) Date: Mar. 3, 2020

(87) PCT Pub. No.: WO2019/103732

PCT Pub. Date: May 31, 2019

(65) Prior Publication Data

US 2020/0188914 A1 Jun. 18, 2020

(51) Int. Cl.
*B01L 3/00* (2006.01)

(52) U.S. Cl.
CPC ... *B01L 3/502715* (2013.01); *B01L 2200/028* (2013.01); *B01L 2200/0684* (2013.01);
(Continued)

(58) Field of Classification Search
CPC ............. B01L 3/502715; B01L 3/5027; B01L 3/502707; B01L 2200/028;
(Continued)

(56) References Cited

U.S. PATENT DOCUMENTS

| | | | |
|---|---|---|---|
| 5,802,856 | A | 9/1998 | Schaper et al. |
| 7,101,509 | B2 | 9/2006 | Chang et al. |

(Continued)

FOREIGN PATENT DOCUMENTS

| | | |
|---|---|---|
| CN | 1529170 | 9/2004 |
| CN | 103080737 | 5/2013 |

(Continued)

OTHER PUBLICATIONS

Ahrberg et al., Polymerase chain reaction in microfluidic devices, Lab on a Chip, Critical Review, Royal Society of Chemistry, DOI: 10.1039/c61c00984k, 2016, 19 pages.

(Continued)

*Primary Examiner* — Matthew D Krcha
*Assistant Examiner* — Austin Q Le
(74) *Attorney, Agent, or Firm* — FOLEY & LARDNER LLP

(57) ABSTRACT

A multizonal microfluidic device can include a substrate with multiple structures mounted thereon, including a first and second lid, and a first and second microchip. The first lid and the substrate can form a first microfluidic chamber between structures including a first interior surface of the first lid and a first discrete portion of the substrate. The first lid can include a first inlet and a first vent positioned relative to one another to facilitate loading of fluid to the first microfluidic chamber via capillary action. A portion of the first microchip can be positioned within the first microfluidic chamber. Furthermore, the second lid can be configured like the first lid and can also be mounted on the substrate forming a second microfluidic chamber with the second microchip positioned within the second microfluidic chamber.

13 Claims, 2 Drawing Sheets

(52) U.S. Cl.
CPC .................. *B01L 2300/0627* (2013.01); *B01L 2400/0406* (2013.01)

(58) Field of Classification Search
CPC ..... B01L 2200/0684; B01L 2300/0627; B01L 2300/0406
See application file for complete search history.

(56) References Cited

U.S. PATENT DOCUMENTS

| | | | | |
|---|---|---|---|---|
| 7,766,467 | B2 | 8/2010 | Silverbrook | |
| 9,758,372 | B1 * | 9/2017 | Kuo | B81C 1/00333 |
| 2003/0012697 | A1 | 1/2003 | Hahn et al. | |
| 2003/0155344 | A1 | 8/2003 | Cobb | |
| 2003/0214650 | A1 | 11/2003 | Dietz et al. | |
| 2005/0012197 | A1 * | 1/2005 | Smith | B81B 7/0061 257/687 |
| 2005/0229696 | A1 * | 10/2005 | Takayama | B01F 25/4338 73/204.26 |
| 2006/0057245 | A1 | 3/2006 | Haupt et al. | |
| 2007/0042565 | A1 | 2/2007 | Smith et al. | |
| 2007/0154355 | A1 | 7/2007 | Berndt et al. | |
| 2008/0199362 | A1 * | 8/2008 | Chong | B01F 25/421 422/400 |
| 2009/0236226 | A1 | 9/2009 | Yuen | |
| 2010/0300895 | A1 | 12/2010 | Nobile et al. | |
| 2011/0086361 | A1 | 4/2011 | Klunder et al. | |
| 2013/0105317 | A1 | 5/2013 | Weber et al. | |
| 2014/0180262 | A1 * | 6/2014 | Farra | A61B 5/076 361/752 |
| 2015/0001083 | A1 | 1/2015 | Martin et al. | |
| 2016/0121329 | A1 | 5/2016 | Kinahan et al. | |
| 2017/0241943 | A1 | 8/2017 | Rothberg et al. | |

FOREIGN PATENT DOCUMENTS

| | | |
|---|---|---|
| CN | 105772125 | 7/2016 |
| CN | 106140338 | 11/2016 |
| EP | 0775306 | 5/1997 |
| RU | 2521639 | 7/2014 |

OTHER PUBLICATIONS

International Search Report dated Sep. 27, 2018 for PCT/US2017/062943, Applicant Hewlett-Packard Development Company, L.P.

* cited by examiner

MULTIZONAL MICROFLUIDIC DEVICES

BACKGROUND

Microfluidics involves the flow of relatively small volumes of a fluid within micrometer-sized channels or smaller. Microfluidic systems have many diverse applications in areas such as biological assays, drug screening, fuel cells, etc. However, the microfluidic behavior of a fluid can differ from the macrofluidic behavior of a fluid. For example, fluid properties such as surface tension and fluidic resistance can play a more dominant role in the microfluidic behavior of fluids than they do on the macroscopic level. Thus, the ability to effectively manipulate fluids in a microfluidics system can expand the number of areas and ways in which these systems can be used.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1A:
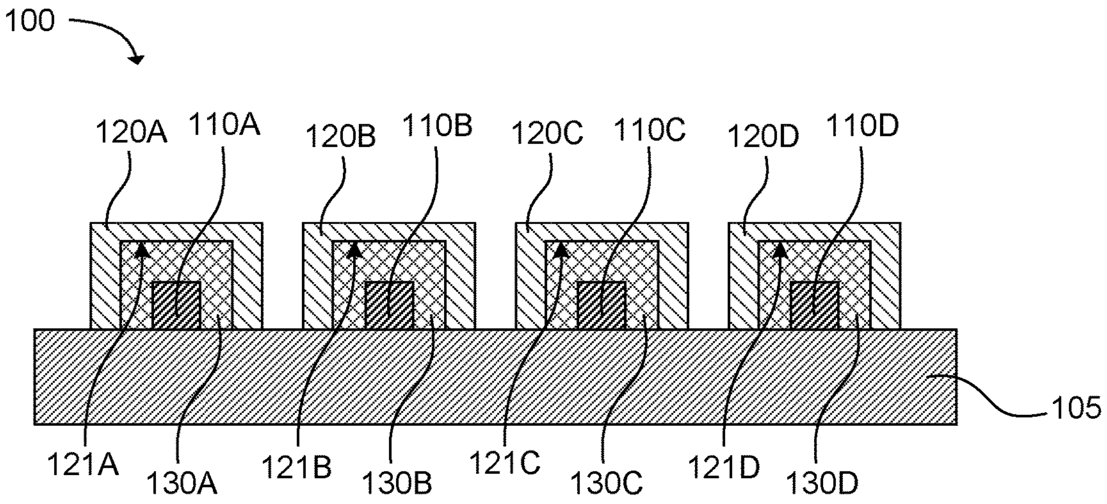
FIG. 1A is a side cross-sectional view of an example microfluidic device in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

Microfluidic devices can be used for a variety of applications, including biotechnology, drug screening, clinical diagnostic testing, etc. The ability to effectively manipulate fluids in a microfluidic device can expand the number of areas and ways in which these devices can be used. For example, where multiple samples can be simultaneously manipulated and/or evaluated, microfluidics can be used to perform multiplexing. Multiplex assays, or multiplexing can be used to simultaneously measure multiple analytes or to measure a common analyte against multiple conditions. The present disclosure describes a multizonal microfluidic device that, in some examples, can be used to perform multiplexing.

A multizonal microfluidic device can include a substrate with multiple structures mounted thereon, including a first lid, a first microchip, a second lid, and a second microchip. The first lid and the substrate can form a first microfluidic chamber between structures including a first interior surface of the first lid and a first discrete portion of the substrate. The first lid can include a first inlet and a first vent positioned relative to one another to facilitate loading of fluid to the first microfluidic chamber via capillary action. A portion of the first microchip can be positioned within the first microfluidic chamber. Furthermore, the second lid and the substrate can form a second microfluidic chamber between structures including a second interior surface of the second lid and a second discrete portion of the substrate. The second lid can include a second inlet and a second vent positioned relative to one another to facilitate loading of fluid to the second microfluidic chamber via capillary action. A portion of the second microchip can be positioned within the second microfluidic chamber.

In another example, a multizonal microfluidic device can include asubstrate with multiple structures mounted thereon, including a first lid, a first microchip, a second lid, a second microchip, a third lid, and a third microchip. The first lid and the substrate can form a first microfluidic chamber between structures including a first interior surface of the first lid and a first discrete portion of the substrate. The first lid can include a first inlet and a first vent positioned relative to one another to facilitate loading of fluid to the first microfluidic chamber via capillary action. A portion of the first microchip can be positioned within the first microfluidic chamber. The first microchip can also include a first functional to component positioned within the first microfluidic chamber. Furthermore, the second lid and the substrate can form a second microfluidic chamber between structures including a second interior surface of the second lid and a second discrete portion of the substrate. The second lid can include a second inlet and a second vent positioned relative to one another to facilitate loading of fluid to the second microfluidic chamber via capillary action. A portion of the second microchip can be positioned within the second microfluidic chamber. The second microchip can also include a second functional component positioned within the second microfluidic chamber. In further detail, the third lid and the substrate can form a third microfluidic chamber between structures including a third interior surface of the third lid and a third discrete portion of the substrate. The third lid can include a third inlet and a third vent positioned relative to one another to facilitate loading of fluid to the second microfluidic chamber via capillary action. A portion of the third microchip can be positioned within the third microfluidic chamber. The third microchip can also include a third functional component positioned within the third microfluidic chamber.

In another example, a multizonal microfluidic device can include a substrate with multiple structures mounted thereon, including a first lid, a first microchip, a second lid, and a second microchip. The first lid and the substrate can form a first microfluidic chamber between structures including a first interior surface of the first lid and a first discrete portion of the substrate. The first lid can include a first inlet and a first vent positioned relative to one another to facilitate loading of fluid to the first microfluidic chamber via capillary action. The first microfluidic chamber can have a volume from 50 pl to 10 μl. A portion of the first microchip can be positioned within the first microfluidic chamber. Furthermore, the second lid and the substrate can form a second microfluidic chamber between structures including a second interior surface of the second lid and a second discrete portion of the substrate. The second lid can include a second inlet and a second vent positioned relative to one another to facilitate loading of fluid to the second microfluidic chamber via capillary action. The second microfluidic chamber can have a volume from 50 pl to 10 μl. A portion of the second microchip can be positioned within the second microfluidic chamber. In still other examples, individual microchips can include functional components, e.g., the first microchip may include a first functional component, the second microchip may include a second functional component, or in some examples, the third microchip may include a third functional component, etc., or combination thereof.

The functional component(s) (first, second, third, etc.) can be the same or different, and can include, for example, a temperature regulator that may include a thermal resistor, or a sensor, such as a temperature sensor, an optical sensor, an electrochemical sensor, or a combination thereof.

With respect to the various multizonal microfluidic devices described herein, in some examples, there can be additional microchips, such as from 1 to 100 additional microchips mounted to the substrate. In further detail, there can be from 1 to 100 additional lids mounted to the substrate to form multiple microfluidic chambers that contain portions of the additional microchips. These two ranges of "additional" microchips and/or lids need not be the same number, as there may be multiple microchips contained, in part, by a single chamber defined by a single lid and the substrate, for example. Other combinations or groupings can also be implemented microchips and lids. In some examples, one or more of the separate discrete microfluidic chambers may include only a single microchip, e.g., the first microfluidic chamber and/or the second microfluidic chamber may contain one microchip and exclude any others. In other examples, one or more of the separate discrete microfluidic chambers can include multiple microchip portions from respective multiple individual microchips. For example, the first microfluidic chamber can also include a second portion of the second microchip. In further examples, the plurality of microchips can include a first individual microchip and a second individual microchip, and the first individual microchip is independently addressable with respect to one or more parameter relative to the second individual microchip. In still additional examples, the first individual microchip can be associated with a first separate discrete microfluidic chamber and the second individual microchip can be associated with a second separate discrete microfluidic chamber. In further detail, individual microchips (e.g., first, second, third, etc.) can be elongated microchips having an aspect ratio of from 1:10 to 1:150 width to length. In other examples, the separate discrete microfluidic chambers can have a volume of from about 50 pl to about 10 μl.

Figure 1B:
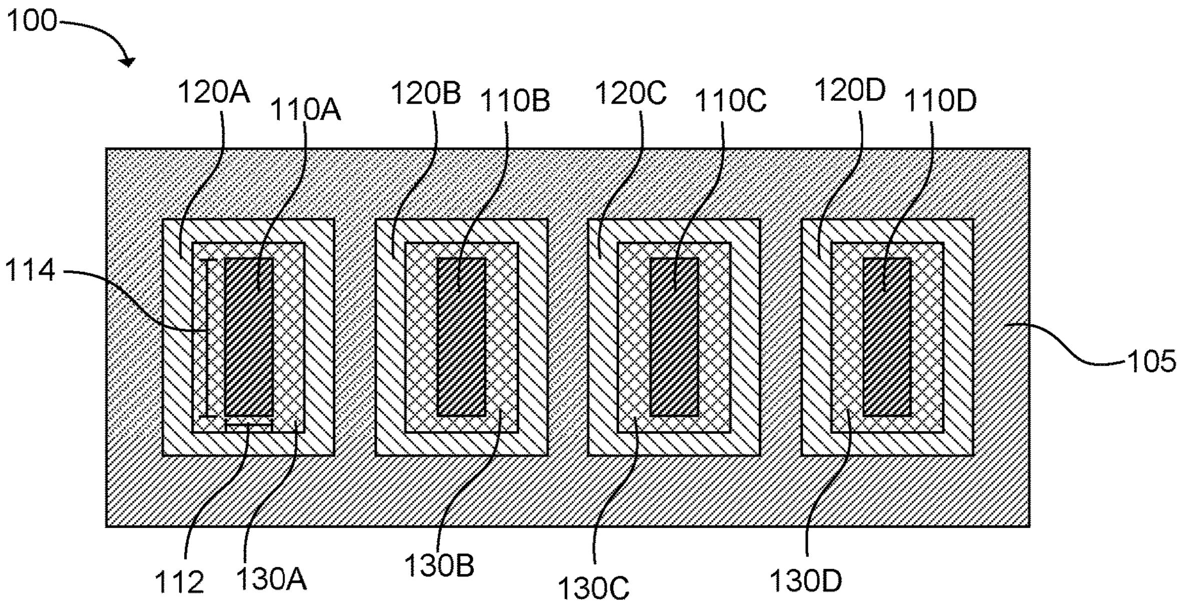
FIG. 1B is a top cross-sectional view of an example microfluidic device in accordance with the present disclosure.
Figure 1C:
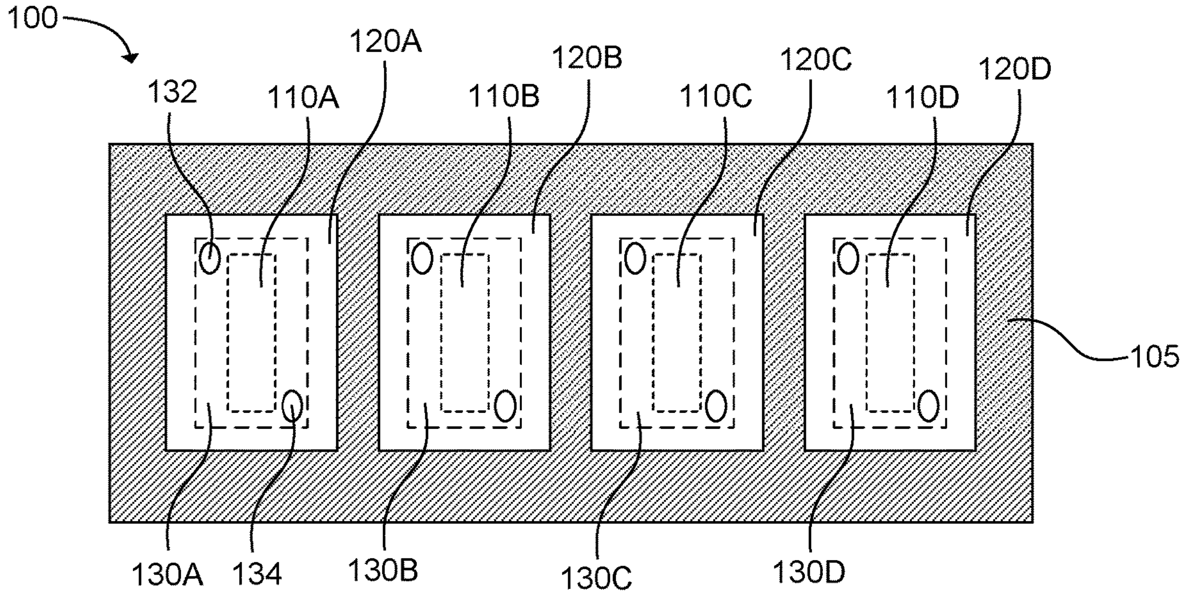
FIG. 1C is a top plan view of an example microfluidic device in accordance with the present disclosure.

Reference will now be made to FIGS. 1A-1C to help describe some of the general features of the multizonal microfluidic devices of the present disclosure. It is noted that the multizonal microfluidic devices depicted in the present figures are not drawn to scale and are not intended to be interpreted as such. The representations of the multizonal microfluidic devices in the figures are merely intended to facilitate the description and presentation of the multizonal microfluidic devices disclosed herein.

With this in mind, FIGS. 1A-1C depict an example of a multizonal microfluidic device 100 having a substrate 105 with multiple microchips 110A, 110B, 110C, 110D mounted thereto. Multiple lids 120A, 120B, 120C, 120D can be mounted to the substrate, which can form separate discrete microfluidic chambers 130A, 130B, 130C, 130D between respective interior surfaces 121A, 121B, 121C, 121D of the plurality of lids and a corresponding portion of the substrate. Individual lids can include an inlet 132 and a vent 134 positioned relative to one another to facilitate loading of a fluid to separate discrete microfluidic chambers via capillary action.

In further detail, a variety of suitable substrates can be used. Typically, any substrate to which the plurality of microchips and the plurality of lids can be mounted, and that is suitable for a particular application, can be used. In some specific examples, the substrate can include or be made of a material such as a metal, glass, silicon, silicon dioxide, a ceramic material (e.g. alumina, aluminum borosilicate, etc.), a polymer material (e.g. polyethylene, polypropylene, polycarbonate, poly(methyl methacrylate), epoxy molding compound, polyamide, liquid crystal polymer (LCP), polyphenylene sulfide, etc.), the like, or a combination thereof. Additionally, the substrate can typically have any suitable dimensions for a given application so long as the plurality of microchips and the plurality of lids can be effectively mounted thereto. Thus, in some examples, the substrate and individual lids can be architecturally compatible to form a complete seal at their interface.

With respect to the plurality of microchips, the actual number of microchips mounted to the substrate can vary for different applications as desired. For example, the multizonal microfluidic device can be used to simultaneously evaluate or manipulate tens, hundreds, thousands, or millions of samples. Thus, multizonal microfluidic devices can be tailored for a variety of desired applications. In some specific examples, the multizonal microfluidic device can include from about 1 microchip to about 10 microchips. In other examples, the multizonal microfluidic device can include from about 5 microchips to about 50 microchips, or from about 10 microchips to about 100 microchips.

By "elongated microchip," it is to be understood that individual microchips generally have an aspect ratio of from 1:10 to 1:1 width 112 to length 114. In some additional examples, individual elongated microchips can have an aspect ratio of from 1:2 to 1:50 width to height. However, in other examples, the microchip is not an elongated microchip such that the microchip can be substantially square, circular, or otherwise fall outside of the aspect ratio described above. It is noted that, in some examples, individual microchips can have substantially the same dimensions. In yet other examples, a first microchip can have predetermined dimensions that are different from a second microchip.

Individual microchips can be made of a variety of materials. In some examples, individual microchips can include or be made of silicon. In other examples, the microchip can include or be made of glass, quartz, or ceramic. In some examples, the microchip can include a wire, a trace, a network of wires, a network of traces, an electrode or the like embedded in or proud of the substrate. It is noted that, in some examples, individual microchips can be made of the same material. In other examples, a first microchip can be made of a different material than a second microchip.

Individual microchips can include a variety of functional components, such as heaters, sensors, electromagnetic radiation sources, fluid actuators, mixers, bubblers, valves, fluid pumps, the like, or combinations thereof, which can vary depending on the intended application of the multizonal microfluidic device. In some examples, individual microchips can include the same functional components. In other examples, a first microchip can include a first functional component or set of functional components and a second microchip can include a second functional component or set of functional components.

As illustrated in FIG. 1A, in some examples, individual microchips 110A, 110B, 110C, 110D can be substantially disposed above the substrate 105. However, in some examples, a microchip, or a portion thereof, can be embedded within the substrate such that a lesser portion of the microchip extends above the substrate. In some further examples, a microchip does not extend above the substrate, but a portion (e.g. a single surface or portion of a surface) of the microchip can be exposed to interact with a fluid introduced into the corresponding discrete microfluidic chamber.

As described above, the separate discrete microfluidic chambers 130A, 130B, 130C, 130D can be formed between respective interior surfaces 121A, 121B, 121C, 121D of the plurality of lids 120A, 120B, 120C, 120D and corresponding portions of the substrate 105. Individual lids can have a variety of dimensions and geometries depending on the particular application and desired configuration of the discrete microfluidic chamber. For example, as illustrated in FIGS. 1A-1C, individual lids can have a rectangular shape. Other geometries can also be employed as desired for particular applications, such as elliptical, circular, arcuate, polygonal, trapezoidal, and other desirable geometries. Generally, individual lids can be shaped to house a portion of a separate microchip 110A, 110B, 110C, 110D that includes a functional component for monitoring or manipulating a test fluid. Individual lids can generally form a fluid seal against the substrate 105 so that fluid can only enter and exit separate discrete microfluidic chambers through designated inlets and outlets, such as inlet 132 and outlet/vent 134. In some examples, where a portion or portions of a microchip extend out of a discrete microfluidic chamber, a lid can also form a fluid seal against a segment or segments of that microchip.

The positioning of the inlet 132 and outlet/vent 134 is not particularly limited. Generally, the inlet and vent are positioned relative to one another to facilitate introduction of a fluid into separate discrete microfluidic chambers 130A, 130B, 130C, 130D via capillary action. Further, in some examples the inlet and vent can be positioned relative to one another to approximate a fluid to or interface a fluid with a portion of a microchip, such as microchips 110A, 1108, 110C, 110D, positioned within a distinct microfluidic chamber to facilitate fluid monitoring and/or manipulation via the microchip.

Individual lids can be formed of a variety of different materials. Non-limiting examples can include glass, quartz, a metal, a polymer, an amorphous polymer, or other suitable materials. Non-limiting examples of polymers can include polydimethylsiloxane (PDMS), cyclic olefin polymer (COP), cyclic olefin copolymer (COC), polyethylene terephthalate (PET), the like, or a combination thereof. In some examples, individual lids can include or be made of a transparent or translucent material such as glass, quartz, polycarbonate, trivex, COC, the like, or a combination thereof. In some examples, individual lids can include or be made of a non-translucent material, such as silicon, a metal, the like, or a combination thereof. In some examples, the material used to manufacture individual lids can be doped with a dopant to enhance thermal performance, optical performance, chemical performance, the like, or a commbination thereof. Non-limiting examples of dopants can include erbium, $AlO_x$, $TaO_x$, or the like. In some examples, individual lids can be made of the same material. In other examples, a first lid can be made of a different material than a second lid. This can be desirable, for example, where some discrete microfluidic chambers are employed to monitor different sample parameters than other discrete microfluidic chambers (e.g. optical vs thermal, for example). Thus, in some cases it may be desirable to have an optically transparent or translucent lid for some discrete microfluidic chambers, whereas other discrete microfluidic chambers may be formed with lids made of an optically opaque material that is more suitable for temperature regulation and monitoring.

The lids can be formed in a variety of ways. Non-limiting examples can include injection molding, cast molding, compression molding, etching, cutting, melting, drilling, routing, the like, or a combination thereof. It is also noted that a single lid can form a single discrete microfluidic chamber or multiple discrete microfluidic chambers.

Generally, individual microchips can be oriented in any suitable way so that the microchip, or a portion thereof, can be positioned within the discrete microfluidic chamber. This can allow a fluid introduced into the discrete microfluidic chamber to interface with, approximate, or otherwise interact with the microchip. In some examples, as illustrated in FIGS. 1B and 10, exposed surfaces (e.g. surfaces, or portions of surfaces, not directly mounted to the substrate 105) of individual microchips 110A, 110B, 110C, 11D can be disposed entirely within corresponding discrete microfluidic chambers 130A, 130B, 130C, 130D.

Figure 2:
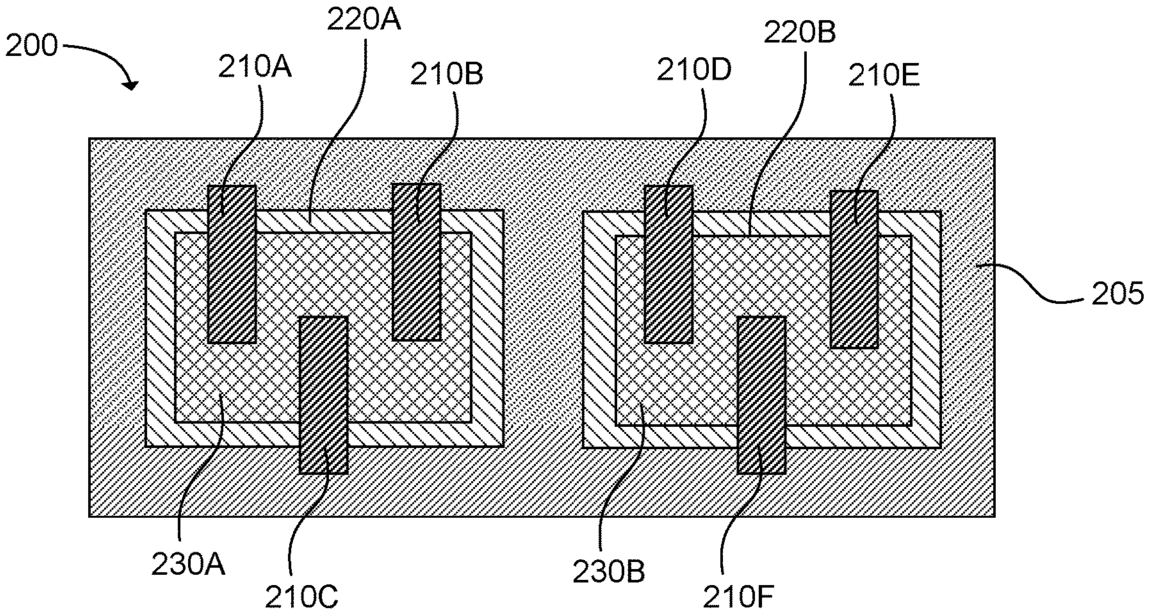
FIG. 2 is a top cross-sectional view of an example microfluidic device in accordance with present disclosure.

In other examples, as illustrated in FIG. 2, a portion of a microchip can be positioned within a corresponding discrete microfluidic chamber (e.g. an internal portion) and a portion or portions of the microchip can be positioned outside of the discrete microfluidic chamber (e.g. an external portion). Thus, in some examples, some portions of exposed surfaces are disposed outside the discrete microfluidic chamber. Specifically, FIG. 2 depicts a multizonal microfluidic device 200 having a substrate 205 and multiple microchips 210A, 210B, 210C, 210D, 210E, 210F mounted thereto. Multiple lids 220A, 220B can also be mounted to the substrate to form separate discrete microfluidic chambers 230A, 230B. As illustrated in FIG. 2, individual microchips can be positioned so that a portion of the microchip is disposed within a discrete microfluidic chamber and a portion of a microchip can be disposed outside of a discrete microfluidic chamber. Thus, a portion of an exposed surface can extend out of a discrete microfluidic chamber. As such, a portion of lid 220A can form a fluidic seal against respective segments of microchips 210A, 210B, 210C as well as a portion of the substrate. Similarly, a portion of lid 220B can form a fluidic seal against respective segments of microchips 210D, 210E, 210F as well as a portion of the substrate. FIG. 2 also illustrates that separate discrete microfluidic chambers can include multiple microchips, or portions thereof. Thus, in some examples, separate distinct microfluidic chambers can include a single microchip, or portion thereof. In other examples, separate distinct microfluidic chambers can include multiple microchips, or respective portions thereof. In still additional examples, a first distinct microfluidic chamber can include a single microchip, or a portion thereof, and a second distinct microfluidic chamber can include multiple microchips, or respective portions thereof.

It is further noted that, in some cases, a first microchip and a second microchip can be independently or differentially addressable or controllable with respect to one or more parameter. Thus, as one non-limiting example, a first microchip can be controlled to transfer a greater amount of heat than a second microchip. In another non-limiting example, a first microchip and a second microchip can be jointly thermally controlled, but the first microchip and the second microchip can employ different sensors that can be independently addressable or controllable. Numerous other examples will be apparent to one skilled in the art. In some examples, where multiple microchips, or respective portions thereof, are positioned within a common discrete microfluidic chamber, a first microchip and a second microchip of the multiple microchips disposed within the common discrete microfluidic chamber can be independently or differentially addressable or controllable. For example, turning again to FIG.2, in some cases microchips 210A, 210B can be jointly addressable or controllable, whereas microchip 210C can be differentially or individually addressable or controllable. In other examples, individual microchips 210A, 210B, 210C can be individually or differentially addressable or controllable. In some additional examples, microchips 210A, 210B, 210C can be jointly controllable or addressable as a first set of microchips and microchips 210D, 210E, 210F can be jointly controllable or addressable as a second set of microchips. In some further examples, the first set of microchips and the second set of microchips can be individually or differentially addressable or controllable. This can also be true where discrete microfluidic chambers include only a single microchip, or portion thereof. Thus, in some examples, a first separate microchip associated with a first discrete microfluidic chamber and a second separate microchip associated with a second discrete microfluidic chamber can be individually or differentially addressable or controllable.

It is also noted that the microchips illustrated in the figures are depicted as being oriented in a substantially parallel manner, but can have other configurations as well. In some examples, the multizonal microfluidic device can include a single line or multiple lines of microchips. In some examples, the microchips can be oriented in a non-uniform or non-parallel manner. However, in some examples, orienting the plurality of microchips in a substantially uniform manner can facilitate mounting of a greater number of microchips on the substrate as compared to non-uniform mounting methods.

Depending on the number of discrete microfluidic chambers included in the device and the particular application of the device, the internal volume of the discrete microfluidic chamber can vary somewhat. In some specific examples, separate discrete microfluidic chambers can have a volume of from about 50 picoliters (pl) to about 10 microliters (μl). In other exam separate discrete microfluidic chambers can have a volume of from about 100 pl to about 500 nanoliters (nl). In yet other examples, separate discrete microfluidic chambers can have a volume of from about 500 pl to about 1 μl. In some examples, the combined volume of the separate discrete microfluidic chambers can be from about 100 nl to about 100 μl. In yet other examples, the combined volume the discrete microfluidic chambers can be from about 500 nl to about 10 μl.

The microfluidic device can be manufactured by mounting multiple microchips to a substrate. Multiple lids can also be mounted to the substrate to form separate discrete microfluidic chambers between structures including respective interior surfaces of individual lids and separate discrete portions of the substrate. Individual lids can include an inlet and a vent positioned relative to one another to facilitate loading of a fluid to the separate discrete microfluidic chambers via capillary action. Individual microchips can include a microchip portion positioned within one or more of the separate discrete microfluidic chambers.

Individual microchips can be mounted to the substrate in any suitable way, such as using wire bonding, die bonding, flip chip mounting, surface mount interconnects, the like, or a combination thereof.

Individual lids can also be mounted to the substrate in a variety of ways. Generally, any mounting process that can form a fluid seal between individual lids and the substrate can be used. This can prepare separate discrete microfluidic chambers that only permit a fluid to enter and exit respective chambers at designated inlet and outlet sites. In some specific examples, mounting an individual lid to the substrate can be performed by adhering the lid to the substrate via an adhesive. In some examples, the adhesive can be a curable adhesive. As such, in some examples, mounting can include curing the adhesive via electromagnetic radiation, heat, chemical agents, the like, or a combination thereof. Non-limiting examples of suitable adhesives can include epoxy adhesives, acrylic adhesives, the like, or a combination thereof. In other examples, individual lids can be mounted to the substrate via laser welding, ultrasonic welding, thermosonic welding, the like, or a combination thereof to mount individual lids directly to the substrate.

By way of one specific example, a microfluidic device can be prepared by mounting multiple microchips, such as silicon microchips, to a substrate. Individual lid structures can then mounted to the substrate to cover, in part, respective silicon microchips and form multiple discrete microfluidic channel about some or all of the respective individual silicon microchips. An inlet and vent can be formed in the opposite ends of individual lid structures to facilitate loading of the discrete microfluidic channel via capillary action. Individual lids can be made from glass, though any of the other structural materials described herein can alternatively be used.

As described above, individual microchips may include a functional component for sensing or manipulating a sample fluid. Thus, in some examples, one or more of the individual microchips can include a temperature regulator. Temperature regulators can include resistive heaters, peltier heaters, the like, or a combination thereof. It is noted that where a temperature regulator is included on individual microchips, the temperature regulator can typically allow rapid temperature cycling within individual discrete microfluidic chambers without having to move a test fluid between different temperature regions. In further examples, one or more of the individual microchips can include a sensor. Any suitable sensor can be used. Non-limiting examples can include optical sensors, thermal sensors, electrochemical sensors. Optical sensors can include a photodiode, a phototransistor, the like, or a combination thereof. Thermal sensors can include a thermocouple, a thermistor, a thermal sense resistor, the like, or a combination thereof. Electrochemical sensors can include a potentiometric sensor, an amperometric sensor, a conductometric sensor, a coulometric sensor, the like, or a combination thereof.

The multizonal microfluidic devices described herein can be used for various types of testing. For example, a device can be loaded with a test fluid into separate microfluidic chambers of a microfluidic device via capillary action. The microfluidic device can include a substrate, multiple microchips mounted to the substrate, and multiple lids mounted to the substrate. The plurality of lids can form separate discrete microfluidic chambers between structures including an interior surface of individual lids and separate discrete portions of the substrate. Individual lids can also include an inlet and a vent positioned relative to one another to facilitate loading of a fluid to the discrete microfluidic chamber via capillary action. Individual microchips can include a microchip portion positioned within one or more of the separate discrete microfluidic chambers. Evaluation of the test fluid introduced into the discrete microfluidic chamber of the microfluidic device can also be carried out, as appropriate for a given testing procedure or fluid to be tested.

Loading the test fluid into separate discrete microfluidic chambers can be performed in a number of ways. In some examples, loading can include introducing separate aliquots of a common test fluid into separate microfluidic chambers. In other examples, loading can include introducing an aliquot of different test fluids into separate microfluidic chambers. In some specific examples, loading can include introducing multiple aliquots of different test fluids into separate microfluidic chambers.

The test fluid can be evaluated in a number of ways. For example, in some cases, evaluating can include optically evaluating, thermally evaluating, electrochemically evaluating, the like, or a combination thereof. The sensors employed in evaluating the test fluid can be external sensors or internal sensors (e.g. incorporated with individual microchips). In some examples, a combination of external sensors and internal sensors can be employed to evaluate the sample. A wide variety of sensors can be used, such as those described elsewhere herein, for example.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, multiple items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the various multizonal microfluidic devices, each of these discussions can be considered applicable to each of these examples, whether or not they are explicitly discussed in the context of that example. Thus, for example, in discussing details about one specific multizonal microfluidic device per se, such discussion can also refer to the other example multizonal devices.

The following illustrates an example of the disclosure. However, it is to be understood that this example is merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

What is claimed is:

1. A multizonal microfluidic device, comprising:

a substrate;

a first lid mounted to the substrate and forming a first microfluidic chamber between structures including a first interior surface of the first lid and a first discrete portion of the substrate, the first lid comprising a first inlet and a first vent positioned relative to one another to facilitate loading of fluid to the first microfluidic chamber via capillary action;

a first microchip mounted to the substrate, wherein a portion of the first microchip is positioned within and extending through the first microfluidic chamber such that the first microchip directly contacts the first lid and forms a fluid seal with the first lid with an entire perimeter of an entire length of the first microchip facing space within the first microfluidic chamber, wherein the first microchip forms the fluid seal with the first lid by extending from a floor of the first microfluidic chamber, through the first lid, and out of the first microfluidic chamber, the fluid seal formed at a contacting point between a bottom of the first lid and a top of the first microchip;

a second lid mounted to the substrate and forming a second microfluidic chamber between structures including a second interior surface of the second lid and a second discrete portion of the substrate, the second lid comprising a second inlet and a second vent positioned relative to one another to facilitate loading of fluid to the second microfluidic chamber via capillary action; and a second microchip mounted to the substrate, wherein a portion of the second microchip is positioned within and extending through the second microfluidic chamber such that the second microchip directly contacts the second lid and forms a fluid seal with the second lid with an entire perimeter of an entire length of the second microchip facing space within the second microfluidic chamber, wherein the first microchip and the second microchip are both elongated microchips and independent have a width to length aspect ratio from 1:10 to 1:150.

2. The multizonal microfluidic device of claim 1, further comprising from 1 to 100 additional microchips mounted to the substrate.

3. The multizonal microfluidic device of claim 2, further comprising from 1 to 100 additional lids mounted to the substrate to form multiple microfluidic chambers that contain portions of the additional microchips.

4. The multizonal microfluidic device of claim 1, wherein the first microfluidic chamber contains a single microchip portion, which is the portion of the first microchip, and wherein the second microfluidic chamber contains a single microchip portion, which is the portion of the second microchip.

5. The multizonal microfluidic device of claim 1, wherein the first microfluidic chamber further includes a second portion of the second microchip.

6. The multizonal microfluidic device of claim 1, wherein the first microchip is independently addressable with respect to a parameter relative to the second microchip.

7. The multizonal microfluidic device of claim 1, wherein the first microfluidic chamber and the second microfluidic chamber independently have an individual volume from 50 pl to 10 μl.

8. The multizonal microfluidic device of claim 1, the first microchip having a first set of one or more functional components, and the second microchip having a second set of one or more functional components that is different from the first set of functional components.

9. The multizonal microfluidic device of claim 1, wherein each of the first microchip and the second microchip includes at least one of a heater, a sensor, an electromagnetic radiation source, a fluid actuator, a mixer, a bubbler, a valve, or a fluid pump.

10. The multizonal microfluidic device of claim 1, wherein the first microchip includes a first sensor, and the second microchip includes a second sensor that is different from the first sensor.

11. The multizonal microfluidic device of claim 1, wherein the first microchip includes a first temperature regulator and a first sensor, and the second microchip includes a second temperature regulator and a second sensor that is different from the first sensor.

12. The multizonal microfluidic device of claim 1, wherein the first lid is formed of a first material and the second lid is formed of a second material that is different from the first material.

13. The multizonal microfluidic device of claim 1, wherein the first lid is optically transparent or translucent, and the second lid is optically opaque.

* * * * *